(12) United States Patent
Chung et al.

(10) Patent No.: US 6,180,702 B1
(45) Date of Patent: Jan. 30, 2001

(54) FLAME RETARDANT POLYCARBONATE COMPOSITION

(75) Inventors: James Y. J. Chung, Wexford; Sivaram Krishnan; Winfried G. Paul, both of Pittsburgh, all of PA (US)

(73) Assignee: Bayer Corporation, Pittsburgh, PA (US)

( * ) Notice: Under 35 U.S.C. 154(b), the term of this patent shall be extended for 0 days.

(21) Appl. No.: 09/371,137

(22) Filed: Aug. 9, 1999

(51) Int. Cl.$^7$ .................................................. C08K 5/42
(52) U.S. Cl. ................................. 524/161; 524/164
(58) Field of Search ............................. 524/161, 164

(56) References Cited

U.S. PATENT DOCUMENTS

| | | | |
|---|---|---|---|
| 3,005,795 | 10/1961 | Busse et al. ........................ 260/45.5 |
| 3,290,412 | 12/1966 | Goldblum ............................ 260/873 |
| 3,294,871 | 12/1966 | Schmitt et al. ...................... 260/900 |
| 3,334,154 | 8/1967 | Kim ..................................... 260/860 |
| 3,382,207 | 5/1968 | Jaquiss ................................ 260/45.7 |
| 3,647,747 | 3/1972 | Bialous ......................... 260/45.75 R |
| 3,723,373 | 3/1973 | Lucas .............................. 260/29.6 F |
| 3,751,400 | 8/1973 | Crennan et al. .................... 260/47 X |
| 3,940,455 | 2/1976 | Kaufman .............................. 260/888 |
| 4,208,489 | 6/1980 | Schmidt et al. ...................... 525/146 |
| 4,220,583 | 9/1980 | Mark .............................. 260/45.7 S |
| 4,391,935 | 7/1983 | Bialous et al. ....................... 524/828 |
| 4,450,249 | * 5/1984 | Schmidt ............................... 524/132 |
| 4,473,685 | * 9/1984 | Mark ................................... 525/146 |
| 4,506,046 | * 3/1985 | Mark ..................................... 524/83 |
| 4,579,906 | 4/1986 | Zabrocki et al. ...................... 525/72 |
| 4,656,227 | 4/1987 | Lindner et al. ....................... 525/133 |
| 4,666,972 | 5/1987 | Köhler et al. ........................ 524/504 |
| 4,749,738 | * 6/1988 | Boutni ................................. 524/267 |
| 4,753,994 | 6/1988 | Carter, Jr. et al. ................... 525/146 |
| 4,767,821 | 8/1988 | Lindner et al. ......................... 525/72 |
| 4,778,848 | 10/1988 | Trabert et al. ......................... 525/66 |
| 4,810,739 | 3/1989 | Lindner et al. ....................... 524/371 |
| 4,983,658 | 1/1991 | Kress et al. .......................... 524/141 |
| 5,280,070 | * 1/1994 | Drzewinski .......................... 525/148 |
| 5,478,874 | * 12/1995 | Miyouga .............................. 524/156 |
| 5,672,645 | * 9/1997 | Eckel .................................. 524/127 |
| 5,773,493 | 6/1998 | Bhatia et al. ........................ 523/328 |
| 6,031,036 | * 2/2000 | Rosenquist .......................... 524/164 |

FOREIGN PATENT DOCUMENTS 899303   3/1999   (EP) .

OTHER PUBLICATIONS

Industrial Eng. Chem., vol. 44, No. 8, (Month Unavailable), 1952, pp. 1800–1805, Lontz et al, "Teflon Tetrafluoroethylene Resin Dispersion".

* cited by examiner

*Primary Examiner*—Paul R. Michl
(74) *Attorney, Agent, or Firm*—Joseph C. Gil; Aron Preis

(57) ABSTRACT

A thermoplastic molding composition comprising polycarbonate resin and additive, positive, amounts of stabilizer and salt is disclosed. The composition is characterized by its freedom from splay and by its improved flame retardance. The stabilizer of the invention is a physical mixture of poly(alkyl methacrylate) with fluorinated polyolefin, and the salt is an alkali metal or alkaline earth metal salt of perfluoroalkane sulfonic acid, aromatic sulfimide, or aromatic sulfonic acid.

10 Claims, No Drawings

FLAME RETARDANT POLYCARBONATE COMPOSITION

The present invention relates to thermoplastic molding compositions and more particularly to flame retardant polycarbonate compositions.

BACKGROUND OF THE INVENTION

Since the issuance of U.S. Pat. No. 3,028,365 in April of 1962, aromatic polycarbonate has become well known and accepted as a thermoplastic resin suitable for a wide variety of uses including injection molding, extrusion and film formation. The chemistry, synthesis, properties and applications of these polycarbonates are extensively discussed in *Chemistry and Physics of Polycarbonates* by Schnell, Interscience, 1964 and *Polycarbonates* by Christopher and Fox, Reinhold, 1962.

Although polycarbonates have some inherent flame resistance, being self-extinguishing, ever more demanding flame retardancy requirements have spawned numerous attempts to increase this property. Two general approaches have been followed.

One approach has been to add substantial amounts of halogen, particularly bromine or chlorine, to polycarbonate compositions. The halogen can be carried by polycarbonate polymer chains as in U.S. Pat. Nos. 3,751,400 and 3,334,154 or by a monomeric compound as in U.S. Pat. No. 3,382,207. However, the presence of substantial amounts of halogen has been found to be detrimental to the properties of the polycarbonate and numerous additives such as those proposed in U.S. Pat. Nos. 3,647,747 and 3,733,295 have been proposed to overcome these detrimental effects.

Flame retardant polycarbonate compositions containing polytetrafluoroethylene (PTFE) are known in the art. U.S. Pat. No. 4,391,935 discloses such compositions which also include certain salts. U.S. Pat. No. 3,294,871 discloses a process for producing molding compositions containing PTFE and a thermoplastic polymer entailing blending the thermoplastic polymer with a latex of the PTFE to produce a dispersed, substantially homogeneous mixture of the PTFE and a thermoplastic polymer and recovering the composition by removing the volatiles therefrom. Among the polymers polycarbonates are listed at col. 3, lines 6–8. The disclosed compositions are said to offer advantages in terms of impact strength, melt index, coefficient of friction, low water permeability and increased HDT.

U.S. Pat. No. 3,005,795 discloses compositions containing PTFE resin in a form of finely divided microfibrous and submicrofibrous particles. Polycarbonates are disclosed at col. 3, lines 18–19 as suitable matrix. Improved moldability of PTFE resins is disclosed in U.S. Pat. No. 3,290,412 to result upon adding thereto of 10 to 40% of polycarbonates.

U.S. Pat. No. 3,723,373 discloses adding PTFE emulsion to polyethylene terephthalate for improved processability. French Patent No. 1,412,767 addresses problems associated with the moldability of PTFE.

Lontz et al in *Industrial and Engineering Chemistry*, Vol.44, No. 8 (1952) at page 1800 describes the general dispersion properties in film forming characteristics of PTFE. Coagulation of the dispersion by the addition of electrolytes or other solvents or by other means is also disclosed.

German published specification DE-OS 33 22 260 discloses PTFE co-precipitated with ABS and added to polycarbonate. Related technologies are disclosed in EP-OS 0,154,138 which disclosed a system entailing ABS and PTFE, DE-OS 34 17 476 which discloses the system of polyamides and PTFE and DE-OS 34 18 750 which concerns the system of ABS co-precipitated with PTFE. Also of relevance are DE-OS 34 20 002, DE-OS 34 22 862, DE-OS 35 12 638 (equivalent to EP-OS 0,174,493), DE-OS 29,48 439 and U.S. Pat. No. 4,208,489.

U.S. Pat. No. 3,940,455 discloses the incorporation of Teflon® in elastomeric hydrocarbons by dissolving the elastomeric polymer in a solvent and incorporating the PTFE to form a suspension and subsequently co-precipitating both by mixing the suspension with a non-solvent. The co-precipitate is said to exhibit improved physical properties.

Also relevant in the present context is U.S. Pat. No. 4,753,994 which disclosed flame retardant polycarbonate compositions containing a co-precipitate of polycarbonate and fluoropolymer. Also relevant is EP 899 303 for its disclosure of a flame retardant polycarbonate composition which contains fluoropolymer resin particles that are encapsulated by thermoplastic SAN copolymer. U.S. Pat. No. 5,773,493 is noted here for its disclosure of a method of dispersing additives such as PTFE in a thermoplastic polymer and the use of the product of the inventive method in preparing molding compositions.

SUMMARY OF THE INVENTION

A thermoplastic molding composition comprising polycarbonate resin and additive, positive, amounts of stabilizer and salt is disclosed. The composition is characterized by its freedom from splay and by its improved flame retardance. The stabilizer of the invention is a physical mixture of poly(alkyl methacrylate) with fluorinated polyolefin, and the salt is an alkali metal or alkaline earth metal salt of perfluoroalkane sulfonic acid, aromatic sulfimide, or aromatic sulfonic acid.

DETAILED DESCRIPTION OF THE INVENTION

The inventive thermoplastic molding composition comprises polycarbonate resin and an additive, positive amounts of Stabilizer and Salt. The total additive amount of the Stabilizer and Salt is about 0.65 to 4.0 percent relative to the weight of the composition, with the proviso that in the instances where the amount of Salt is 0.1 percent or less, the amount of Stabilizer is more than 0.5%. The inventive composition is characterized in that that its flammability rating in accordance with a UL-94 standard is at least V-0 at $\frac{1}{16}$" thick specimens. The inventive composition is further characterized in that articles molded therefrom are virtually free of splay. Splay refers to a surface defect which appears as silver-while streaking, generally along the flow direction of molded articles. Splay is especially prominent on the surface of articles molded of dark or deep-colored compositions.

Suitable polycarbonate resins for preparing the composition of the present invention are homopolycarbonates and copolycarbonates and mixtures thereof.

The polycarbonates generally have a weight average molecular weight of 10,000 to 200,000, preferably 20,000 to 80,000, and their melt flow rate, per ASTM D-1238 at 300° C., is about 1 to about 65 g/10 min., preferably about 2 to 15 g/10 min. They may be prepared, for example, by the known diphasic interface process from a carbonic acid derivative such as phosgene and dihydroxy compounds by polycondensation (see German Offenlegungsschriften 2,063,050;

2,063,052; 1,570,703; 2,211,956; 2,211,957 and 2,248,817; French Patent 1,561,518; and the monograph by H. Schnell, "Chemistry and Physics of Polycarbonates", Interscience Publishers, New York, N.Y., 1964, all incorporated herein by reference).

In the present context, dihydroxy compounds suitable for the preparation of the polycarbonates of the invention conform to the structural formulae (1) or (2).

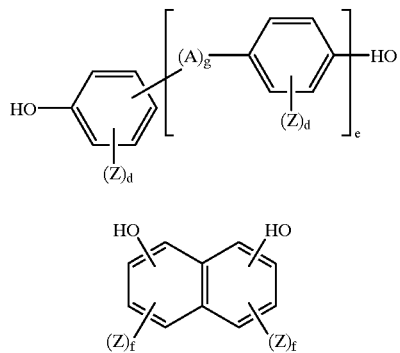

wherein

A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO— or —SO$_2$ or a radical conforming to

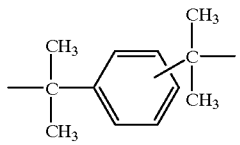

e and g both denote the number 0 to 1;

Z denotes F, Cl, Br or $C_1$–$C_4$ alkyl and if several Z radicals are substituents in one aryl radical, they may be identical or different from one another;

d denotes an integer of from 0 to 4; and f denotes an integer of from 0 to 3.

Among the dihydroxy compounds useful in the practice of the invention are hydroquinone, resorcinol, bis-(hydroxyphenyl)-alkanes, bis-(hydroxyphenyl)-ethers, bis-(hydroxyphenyl)-ketones, bis-(hydroxyphenyl)-sulfoxides, bis-(hydroxyphenyl)-sulfides, bis-(hydroxyphenyl)-sulfones, α,α-bis-(hydroxyphenyl)-diisopropyl-benzenes, as well as their nuclear-alkylated compounds and dihydroxydiphenyl cycloalkanes. These and further suitable aromatic dihydroxy compounds are described, for example, in U.S. Pat. Nos. 5,227,458; 5,105,004; 5,126,428; 5,109,076; 5,104,723; 5,086,157; 3,028,356; 2,999,835; 3,148,172; 2,991,273; 3,271,367; and 2,999,846, all incorporated herein by reference.

Further examples of suitable bisphenols are 2,2-bis-(4-hydroxyphenyl)-propane (bisphenol A), 2,4-bis-(4-hydroxyphenyl)-2-methyl-butane, 1,1-bis-(4-hydroxyphenyl)-cyclohexane, α,α'-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(3,5-dimethyl-4-hydroxyphenyl)-sulfide, bis-(3,5-dimethyl-4-hydroxyphenyl)-sulfoxide, bis-(3,5-dimethyl-4-hydroxyphenyl)-sulfone, dihydroxy-benzophenone, 2,4-bis-(3,5-dimethyl-4-hydroxyphenyl)-cyclohexane, α,α'-bis-(3,5-dimethyl-4-hydroxyphenyl)-p-diisopropylbenzene and 4,4'-sulfonyl diphenol.

Examples of particularly preferred aromatic bisphenols are 2,2-bis-(4-hydroxyphenyl)-propane, 2,2-bis-(3,5-dimethyl-4-hydroxyphenyl)-propane, 1,1-bis-(4-hydroxyphenyl)-cyclohexane and 1,1-bis-(4-hydroxyphenyl)-3,3,5-trimethylcyclohexane.

The most preferred bisphenol is 2,2-bis-(4-hydroxyphenyl)-propane (bisphenol A).

The polycarbonates of the invention may entail in their structure units derived from one or more of the suitable bisphenols.

Among the resins suitable in the practice of the invention are phenolphthalein-based polycarbonates, copolycarbonates and terpolycarbonates such as are described in U.S. Pat. Nos. 3,036,036 and 4,210,741, both incorporated by reference herein.

The polycarbonates of the invention may also be branched by condensing therein small quantities, e.g., 0.05 to 2.0 mole % (relative to the bisphenols) of polyhydroxy compounds. Polycarbonates of this type have been described, for example, in German Offenlegungsschriften 1,570,533; 2,116,974 and 2,113,374; British Patents 885,442 and 1,079, 821 and U.S. Pat. No. 3,544,514. The following are some examples of polyhydroxyl compounds which may be used for this purpose: phloroglucinol; 4,6-dimethyl-2,4,6-tri-(4-hydroxyphenyl)-heptane; 1,3,5-tri-(4-hydroxyphenyl)-benzene; 1,1,1-tri-(4-hydroxyphenyl)-ethane; tri-(4-hydroxyphenyl)-phenylmethane; 2,2-bis-[4,4-(4,4'-dihydroxydiphenyl)]-cyclohexyl-propane; 2,4-bis-(4-hydroxy-1-isopropylidine)-phenol; 2,6-bis-(2'-dihydroxy-5'-methylbenzyl)-4-methyl-phenol; 2,4-dihydroxybenzoic acid; 2-(4-hydroxyphenyl)-2-(2,4-dihydroxy-phenyl)-propane and 1,4-bis-(4,4'-dihydroxytriphenylmethyl)-benzene. Some of the other polyfunctional compounds are 2,4-dihydroxy-benzoic acid, trimesic acid, cyanuric chloride and 3,3-bis-(4-hydroxyphenyl)-2-oxo-2,3-dihydroindole.

In addition to the polycondensation process mentioned above, other processes for the preparation of the polycarbonates of the invention are polycondensation in a homogeneous phase and transesterification. The suitable processes are disclosed in the incorporated herein by reference U.S. Pat. Nos. 3,028,365; 2,999,846; 3,153,008 and 2,991, 273.

The preferred process for the preparation of polycarbonates is the interfacial polycondensation process.

Other methods of synthesis in forming the polycarbonates of the invention such as disclosed in U.S. Pat. No. 3,912, 688, incorporated herein by reference, may be used.

Suitable polycarbonate resins are available in commerce, for instance, Makrolon 2400, Makrolon 2600, Makrolon 2800 and Makrolon 3100, all of which are bisphenol based homopolycarbonate resins differing in terms of their respective molecular weights and characterized in that their melt flow indices (MFR) per ASTM D-1238 are about 16.5 to 24, 13 to 16, 7.5 to 13.0 and 3.5 to 6.5 g/10 min., respectively. These are products of Bayer Corporation of Pittsburgh, Pa.

A polycarbonate resin suitable in the practice of the invention is known and its structure and methods of preparation have been disclosed, for example, in U.S. Pat. Nos. 3,030,331; 3,169,121; 3,395,119; 3,729,447; 4,255,556;

4,260,731; 4,369,303; 4,714,746 and 5,227,458, all of which are incorporated by reference herein.

The stabilizer (Stabilizer) in accordance with the invention is a physical mixture of poly(alkyl methacrylate) with fluorinated polyolefin. The preparation of a suitable Stabilizer entails blending of an emulsion of poly(alkyl methacrylate) with an emulsion of fluorinated polyolefin. The resulting mixture of emulsions is then coagulated or freeze dried, or spray dried, to produce the Stabilizer, using the procedures well known to the art-skilled.

The poly(alkyl methacrylate) is a homopolymer or a copolymer of at least one $C_1$–$C_{15}$-alkyl methacrylate. Among the examples, mention may be made of methyl-, butyl-, decyl-, dodecyl- and tridecyl-methacrylates.

The fluorinated polyolefin suitable in the present invention is capable of forming an emulsion and forms fibrils upon shearing. The preferred fluorinated polyolefin is polytetrafluoroethylene (PTFE). The suitable PTFE emulsion in water has a mean particle size of 0.05 to 20, preferably 0.08 to 10 microns, and solid content of about 30 to 70, preferably 50 to 60 percent by weight. Suitable PTFE emulsions are commercially available from DuPont as Teflon® 30N.

A suitable Stabilizer contains about 5 to 30, preferably 10 to 20%, by weight of PTFE. The Stabilizer suitable for the invention is available in commerce from Mitsubishi Rayon Co. Ltd. under the product name Metablen™ A-3000.

The salt suitable in the present invention (Salt) include perfluoroalkane sulfonate salts of alkali metal or alkaline earth metal. Such salts have been disclosed in U.S. Pat. Nos. 3,775,367, 4,469,833, 4,626,563, 4,626,563 and 4,649,168 which are incorporated herein by reference.

Examples of alkali metal salts of organic acids suitable according to the invention are sodium or potassium perfluorobutane sulphonate, sodium or potassium perfluoromethane sulphonate, sodium or potassium 2,5-dichlorobenzene sulphonate, sodium or potassium 2,4,5-trichlorobenzene-sulphonate, sodium or potassium (4-chlorophenyl) phosphonate, sodium or potassium methylphosphonate, sodium or potassium (2-phenylethyl)-phosphonate, sodium or potassium pentachlorobenzoate, sodium or potassium 2,4,6-trichlorobenzoate, sodium or potassium 2,4-dichlorobenzoate and lithium phenylphosphonate.

Also included are the salts which have been disclosed in U.S. Pat. No. 4,469,833 which is incorporated by reference herein:

(A) alkali and alkaline earth metal salts of substituted and unsubstituted sulfonic acids of aromatic sulfides;
(B) alkali and alkaline earth metal salts of halocycloaliphatic aromatic sulfonic acids;
(C) alkali and alkaline earth metal salts of sulfonic acids of heterocyclic compounds;
(D) alkali and alkaline earth metal salts of substituted and unsubstituted sulfonic acids of aromatic ketones;
(E) alkali and alkaline earth metal salts of monomeric or polymeric aromatic sulfonic acids;
(F) alkali and alkaline earth metal salts of monomeric or polymeric substituted aromatic sulfonic acids;
(G) alkali and alkaline earth metal salts of monomeric or polymeric aromatic amide sulfonic acids;
(H) alkali and alkaline earth metal salts of sulfonic acids of aromatic ethers;
(I) alkali and alkaline earth metal salts of monomeric or polymeric sulfonic acids of aromatic carboxylic acids; and
(J) alkali and alkaline earth metal salts of monomeric or polymeric phenol esters of sulfonic acids.

Also, the salt forms of aromatic sulfimides including alkali metal salt of saccharin, N-(p-tolylsulfonyl)-p-toluenesulfimide, N-(N'-benzylamino-carbonyl) sulfanilimide, N-(phenylcarboxyl)-sulfanilimide, N-(2-pyrimidinyl)sulfanilimide, N-(2-thiazolyl)sulfanilimide and the other salts of the sulfimides disclosed in U.S. Pat. No. 4,254,015 which is incorporated herein by reference.

The preparation of the inventive composition is conventional and follows procedures which are well known in the art. In addition to the Salt and Stabilizer which are essential components of the composition, other additives may be included, such as fillers, reinforcement agents, pigments, dyes, antioxidants, heat stabilizers, UV light absorbers and mold release agents all of which are known in the art for their recognized function and all are added in such known functional amounts.

The invention is further illustrated but is not intended to be limited by the following examples in which all parts and percentages are by weight unless otherwise specified.

EXPERIMENTAL

Compositions in accordance with the invention were prepared and their properties evaluated as described below. The indicated components noted in the table, amounts noted in percent by weight, were processed conventionally and the test specimens were molded following conventional procedures and practices. The polycarbonate resin used in making the compositions was Makrolon 2608 polycarbonate based on bisphenol-A, a product of Bayer, having a melt flow rate—MFR—(per ASTM D 1238) of about 10 g/10 min. The Stabilizer used in the compositions described below was Metablen A-3000 and the Salt used was potassium perfluorobutane sulfonate. The amounts of the components are noted in percents relative to the weight of the composition. All the compositions contained small amounts of a conventional mold release agent and carbon black, neither of which are believed critical to the inventive composition. The 60 degree gloss values (Gloss) were determined in accordance with ASTM D2457 and the flammability ratings (Flammability) are in accordance with UL-94 at ¹⁄₁₆".

To illustrate the invention, the compositions represented below contained varying amounts of Stabilizer and Salt. The compositions reported in Table 1 contained varying amounts of Stabilizer at a constant amount, 0.1%, of Salt.

TABLE 1

| Example | 1$^c$ | 2 | 3 | 4 | 5 |
| --- | --- | --- | --- | --- | --- |
| Component | | | | | |
| polycarbonate | 97.95 | 97.45 | 96.95 | 96.45 | 95.95 |
| Stabilizer | 0.5 | 1.0 | 1.5 | 2.0 | 2.5 |
| Salt | 0.1 | 0.1 | 0.1 | 0.1 | 0.1 |
| Properties: | | | | | |
| MFR | 13.3 | 15.3 | 17.8 | 14.6 | 17 |
| gloss | 104 | 102 | 103 | 102 | 101 |
| Flammability | V-2 | V-0 | V-0 | V-0 | V-0 |

$^c$denotes a comparison example.

A corresponding set of compositions all containing 0.2 wt. % of salt has been prepared and evaluated as shown in Table 2.

TABLE 2

| Example | 6 | 7 | 8 | 9 | 10 |
|---|---|---|---|---|---|
| Component | | | | | |
| polycarbonate | 97.85 | 97.35 | 96.85 | 96.35 | 95.85 |
| Stabilizer | 0.5 | 1.0 | 1.5 | 2.0 | 2.5 |
| Salt | 0.2 | 0.2 | 0.2 | 0.2 | 0.2 |
| Properties: | | | | | |
| MFR | 13.8 | 15.7 | 19.3 | 13.9 | 18.2 |
| gloss | 103 | 103 | 103 | 102 | 101 |
| Flammability | V-0 | V-0 | V-0 | V-0 | V-0 |

A yet additional set of compositions all containing 0.3 wt. % of salt has been prepared and evaluated as shown in Table 3.

TABLE 3

| Example | 11 | 12 | 13 | 14 | 15 |
|---|---|---|---|---|---|
| Component | | | | | |
| polycarbonate | 97.75 | 97.25 | 96.75 | 96.25 | 95.75 |
| Stabilizer | 0.5 | 1.0 | 1.5 | 2.0 | 2.5 |
| Salt | 0.3 | 0.3 | 0.3 | 0.3 | 0.3 |
| Properties: | | | | | |
| MFR | 13.7 | 15.6 | 14.1 | 13.6 | 13.2 |
| gloss | 104 | 103 | 101 | 102 | 100 |
| Flammability | V-0 | V-0 | V-0 | V-0 | V-0 |

A series of experiments comparing the composition of the invention to corresponding compositions which are outside the inventive scope has been conducted and the results are summarized below. The polycarbonate resin, the Stabilizer and Salt were as described above, as were the mold release agent and pigment. The results are summarized in Table 4.

TABLE 4

| Example | 16 | 17$^c$ | 18$^c$ | 19$^c$ |
|---|---|---|---|---|
| Component | | | | |
| polycarbonate | 96.3 | 94.3 | 92.3 | 90.3 |
| Stabilizer | 2.0 | 4.0 | 6.0 | 8.0 |
| Salt | 0.25 | 0.25 | 0.25 | 0.25 |
| Properties: | | | | |
| MFR | 15.9 | 11.2 | 12.7 | 10.5 |
| gloss (average) | 102 | 90 | 79 | 66 |
| Flammability | V-0 | V-1 | F* | F |

$^c$denotes a comparison example
*F denotes failure

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A thermoplastic molding composition comprising polycarbonate resin and an additive, positive amounts of stabilizer and salt, wherein the total additive amount of said stabilizer and salt is about 0.65 to 4.0 percent relative to the weight of the composition, with the proviso that in the instances where the amount of salt is 0.1 percent or less, the amount of stabilizer is more than 0.5%, wherein said stabilizer is a physical mixture of poly(alkyl methacrylate) with fluorinated polyolefin wherein said fluorinated polyolefin constitute about 5 to 30 percent relative to the weight of said physical mixture, and wherein said salt is at least one member selected from the group consisting of alkali metal salt of perfluoroalkane sulfonic acid, alkaline earth metal salt of perfluoroalkane sulfonic acid, alkali metal salt of aromatic sulfimide, organic alkali metal salt of aromatic sulfonic acid and alkaline earth metal salt of aromatic sulfonic acid.

2. The molding composition of claim 1 wherein said fluorinated polyolefin constitute about 10 to 20 percent relative to the weight of said physical mixture.

3. The molding composition of claim 1 wherein said polycarbonate resin is a homopolycarbonate based on bisphenol-A.

4. The molding composition of claim 1 wherein poly (alkyl methacrylate) is a homopolymer or a copolymer of at least one $C_1$—$C_{15}$-alkylmethacrylate.

5. The molding composition of claim 4 wherein poly (alkyl methacrylate) is at least one member selected from the group consisting of methyl methacrylate, butyl methacrylate, decyl methacrylate, dodecyl methacrylate and tridecyl methacrylate.

6. The thermoplastic molding composition of claim 1 wherein said physical mixture is a dried blending of an emulsion of poly(alkyl methacrylate) with an emulsion of fluorinated polyolefin.

7. The molding composition of claim 6 wherein emulsion of fluorinated polyolefin has a mean particle size of 0.05 to 20 microns.

8. The molding composition of claim 6 wherein emulsion of fluorinated polyolefin has a mean particle size of 0.08 to 10 microns.

9. The molding composition of claim 1 wherein said salt is at least one member selected from the group consisting of sodium perfluorobutane sulphonate, potassium perfluorobutane sulphonate, sodium perfluoromethane sulphonate, potassium perfluoromethane sulphonate, sodium 2,5-dichlorobenzene sulphonate, potassium 2,5-dichlorobenzene sulphonate, sodium 2,4,5-trichlorobenzene-sulphonate, potassium 2,4,5-trichlorobenzene-sulphonate, sodium (4-chlorophenyl) phosphonate, potassium (4-chlorophenyl)phosphonate, sodium methylphosphonate, potassium methylphosphonate, sodium (2-phenylethyl)-phosphonate, potassium (2-phenylethyl)-phosphonate, sodium pentachlorobenzoate, potassium pentachlorobenzoate, sodium 2,4,6-trichlorobenzoate, potassium 2,4,6-trichlorobenzoate, sodium 2,4-dichlorobenzoate, potassium 2,4-dichlorobenzoate and lithium phenylphosphonate.

10. A thermoplastic molding composition comprising homopolycarbonate resin based on bisphenol-A and an additive, positive amounts of stabilizer and salt, wherein the total additive amount of said stabilizer and salt is about 0.65 to 4.0 percent relative to the weight of the composition, with the proviso that in the instances where the amount of salt is 0.1 percent or less, the amount of stabilizer is more than 0.5%, wherein said stabilizer is a physical mixture of a homopolymer or a copolymer of at least one $C_1$–$C_{15}$-alkylmethacrylate, with fluorinated polyolefin wherein said fluorinated polyolefin constitute about 10 to 20 percent relative to the weight of said physical mixture, and wherein said salt is at least one member selected from the group consisting of sodium perfluorobutane sulphonate, potassium perfluorobutane sulphonate, sodium perfluoromethane sulphonate, potassium perfluoromethane sulphonate, sodium 2,5-dichlorobenzene sulphonate, potassium 2,5-dichlorobenzene sulphonate, sodium 2,4,5- trichlorobenzene-sulphonate, potassium 2,4,5-trichlorobenzene-sulphonate, sodium (4-chlorophenyl)phosphonate, potassium (4-chlorophenyl)phosphonate, sodium methylphosphonate, potassium methylphosphonate, sodium (2-phenylethyl)-phosphonate, potassium (2-phenylethyl)-phosphonate, sodium pentachlorobenzoate, potassium pentachlorobenzoate, sodium 2,4,6-trichlorobenzoate, potassium 2,4,6-trichlorobenzoate, sodium 2,4-dichlorobenzoate, potassium 2,4-dichlorobenzoate and lithium phenylphosphonate.

\* \* \* \* \*